United States Patent
Forestiere et al.

(12)

(10) Patent No.: US 6,184,315 B1
(45) Date of Patent: Feb. 6, 2001

(54) PROCESS FOR POLYMERIZATION IN THE PRESENCE OF ALPHA OLEFINS

(75) Inventors: Alain Forestiere; François Hugues, both of Vernaison (FR)

(73) Assignee: Institut Francais du Petrole (FR)

( * ) Notice: Under 35 U.S.C. 154(b), the term of this patent shall be extended for 0 days.

(21) Appl. No.: 09/252,869

(22) Filed: Feb. 18, 1999

(30) Foreign Application Priority Data

Feb. 18, 1998 (FR) .................................................. 98 02056

(51) Int. Cl.⁷ ...................................................... C08F 2/00
(52) U.S. Cl. ................ 526/68; 526/65; 526/67; 585/850; 585/851; 585/852
(58) Field of Search ................ 526/68, 65, 67; 585/850, 851, 852

(56) References Cited

FOREIGN PATENT DOCUMENTS

| 683176 | * 11/1995 | (EP) . |
| 0683176A | 11/1995 | (EP) . |
| 0742234A | 11/1996 | (EP) . |

* cited by examiner

*Primary Examiner*—David W. Wu
*Assistant Examiner*—William Cheung
(74) *Attorney, Agent, or Firm*—Millen, White, Zelano & Branigan, P.C.

(57) ABSTRACT

The polymerization process is carried out starting from a monomer that is introduced via pipe (1) and a comonomer that is introduced via pipe (2); the comonomer that is used, which is an alpha-olefin, is introduced into polymerization reactor P in the form of an approximately pure compound. The polymerization effluent is then separated in separator S1 into two fractions: a heavy fraction that is evacuated via pipe (5) and that contains at least one polymer, and a light fraction that is evacuated via pipe (4) and that comprises the monomer that has not reacted, the comonomer that has not reacted, as well as isomers of this comonomer. At least a portion of the light fraction is then treated during an ethenolysis stage E in the presence of an addition of fresh ethylene that is introduced via line (9). The effluent that is produced in the ethenolysis stage is subjected to at least two separations in separation train S2. After the fraction that contains the light olefins and the fraction that contains the heavy compounds have been separated, the fraction that comprises the comonomer is recycled via pipe (10) toward polymerization zone P.

17 Claims, 1 Drawing Sheet

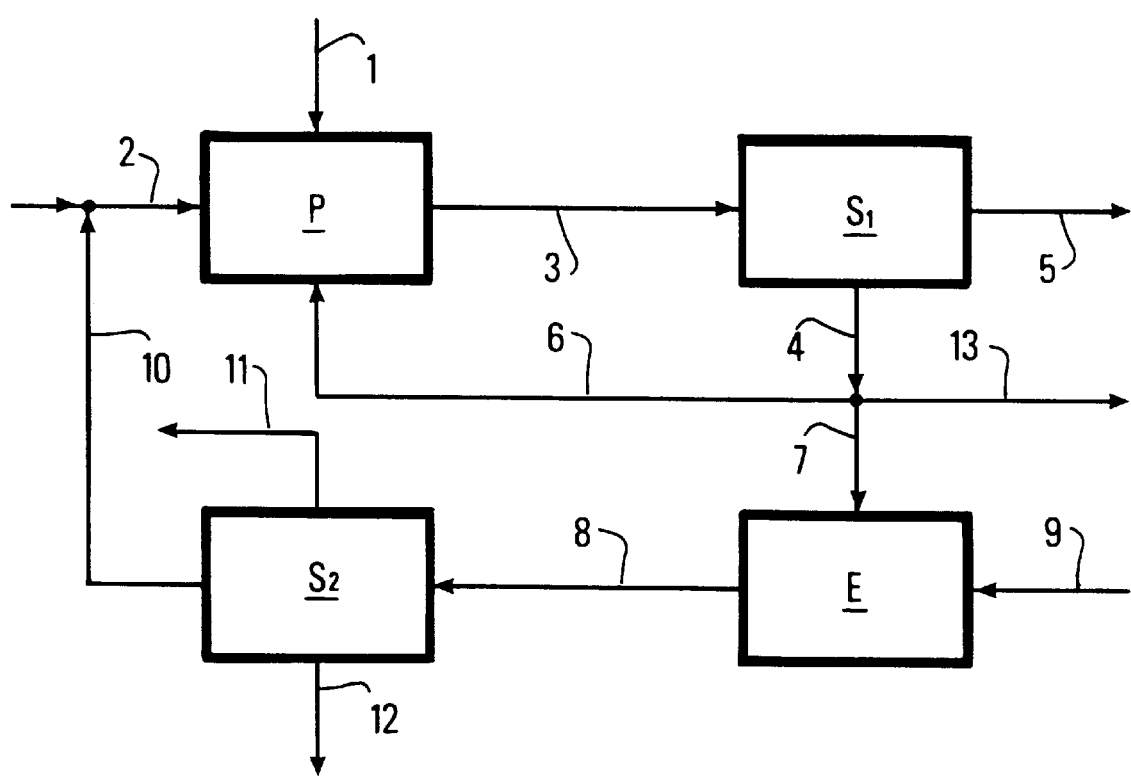

PROCESS FOR POLYMERIZATION IN THE PRESENCE OF ALPHA OLEFINS

BACKGROUND OF THE INVENTION

This invention relates to the area of polymerization and more particularly to the polymerization of unsaturated hydrocarbons. Polymerization generally consists in reacting together compounds that comprise an unsaturation or a reactive function: monomers. The products that are obtained at the end of the reaction are in the form of long chains in which the same pattern is repeated: these are the polymers. Very often, the polymerization effluent also contains monomers that have not reacted; at least a portion of these monomers are generally recycled toward the polymerization zone, and the device is then designated as a "polymerization loop."

Polymerization can be assisted by comonomers. These comonomers, if they enhance the reactivity of the monomers and the quality of the polymers that are produced, are less reactive than the monomers, however. These are generally expensive compounds; it is therefore advantageous to provide for the recycling of comonomers that have not reacted.

In the process according to the invention, the comonomer that is used is an alpha-olefin. When a comonomer is introduced into the polymerization zone, isomers of this comonomer are also very often introduced; moreover, during polymerization, the comonomer is also unavoidably formed from isomers of the comonomer (internal olefins).

These isomers are not reactive; in general they are inert relative to the polymerization reaction. If no provision is made for purging of the polymerization loop, these isomers accumulate and can then represent a large portion of the fluid that is assumed to contain basically the comonomer that circulates in the polymerization loop. The isomers then play a role of contaminating the polymerization loop.

One skilled in the art knows that it is often very difficult to separate the internal olefins from the alpha-olefins, whereby the internal olefins have in particular boiling points that are close to that of the corresponding alpha-olefin. Consequently, provision is generally made for significant purging. It has the drawback of the loss of comonomers, however.

SUMMARY OF THE INVENTION

One of the objects of this invention is to increase the proportion of alpha-olefins (comonomers) in the recycled fluid; to do this, the polymerization purging is subjected to a metathesis reaction in the presence of ethylene (also called "ethenolysis"), which makes it possible to transform a portion of the internal olefins into lighter olefins that will then be eliminated easily to obtain a comonomer concentrate (alpha-olefin).

The ethenolysis reaction for the production of alpha-olefins from internal olefins is well known to one skilled in the art; it is described by, for example, Bradshaw, Howman and Turner in "Olefin Dismutation: Reactions of Olefins on Cobalt Oxide-Molybdenum Oxide-Alumina" J. Catal., 7(3), 269–76 that was published in 1967.

In addition, descriptions of processes of polymerization and of copolymerization of ethylene in the presence of an alpha-olefin are found in the literature. These are, for example Patents EP 50477 and EP 1167248, in which the ethylene reacts with an addition of alpha-olefins and in which the recycling of the monomers that have not reacted is provided for.

This invention relates to a polymerization process that is carried out in at least one reactor that contains at least one catalyst starting from a monomer and a comonomer, and the comonomer that is used, which is an alpha-olefin, is introduced into the polymerization reactor in the form of an approximately pure compound. "Approximately pure compound" in the context of this description is defined as the flow that contains at least 90% by weight of comonomer, preferably at least 95% by weight of comonomer and, even more preferably, at least 97% by weight of comonomer.

The polymerization effluent is then separated into two fractions: a heavy fraction that contains at least one polymer, and a light fraction that comprises the monomer that has not reacted, the comonomer that has not reacted, as well as isomers of this comonomer. At least a portion of the light fraction is then treated during an ethenolysis stage in the presence of an addition of fresh ethylene. The effluent that is produced in the ethenolysis stage is subjected to at least two separations, at the end of which the fraction that contains the comonomer is separated, on the one hand, from the lighter fraction and, on the other, from the fraction that is heavier than it is, whereby this fraction that contains the comonomer is then recycled to the polymerization zone.

The invention also relates to an installation for the implementation of this process.

According to an embodiment of the invention, a feedstock that contains at least partly, if not mostly, a monomer undergoes polymerization in the presence of a comonomer.

The effluent from this polymerization is then separated into two fractions: a heavy fraction that contains the synthesized polymers, and a light fraction that contains the monomer, the fraction of the comonomer that has not reacted as well as isomers of this comonomer and also sometimes a solvent that is used for the polymerization reaction. It has been possible to introduce isomers of this comonomer with the comonomer, but often the majority of these isomers are formed from the comonomer during the polymerization reaction.

After polymerization and then separation, at least a portion of the light fraction of the effluent is subjected to ethenolysis. Generally, another portion of this light fraction is directly recycled toward the polymerization zone, whereby the remainder of the light fraction is evacuated from the polymerization loop via a purge. The effluent from the ethenolysis reaction then undergoes at least two separations to isolate the fraction that contains the comonomer, whereby said fraction is then recycled toward the polymerization zone.

The comonomer that is used for the polymerization reaction is selected based on its ability to enhance the physical properties of the polymer that it is desired to obtain; generally the polymerization reaction is carried out in the presence of a single comonomer. For example, to obtain polyethylene or polypropylene, the comonomer is generally selected from the group that is formed by 1-butene, 1-hexene, 1-octene, 4-methyl 1-pentene, and 1-pentene, and it is introduced into the polymerization feedstock in an amount such that it represents about 1% to 50% by weight relative to the polymerization feedstock, for example, 1-butene is generally introduced in amounts of about 1% to 10% by weight relative to the feedstock, and 1-octene is generally introduced in amounts of about 1% to 50% by weight relative to the feedstock, and 1-hexene is generally introduced in amounts of about 1% to 20% by weight relative to the polymerization feedstock—whereby this feedstock contains both fresh and recycled compounds.

The monomer that is used in the polymerization reaction can be any polymerizable unsaturated monomer; preferably this monomer is ethylene or propylene. The monomer that is used for the polymerization reaction should be very pure, i.e., the flow contains at least 90% by weight of monomer, preferably at least 95% by weight of monomer, and even more preferably at least 99% by weight of monomer.

The treated effluent can be any polymerization effluent that contains internal olefins and in particular an effluent from the polymerization of ethylene.

Without limiting the scope of this invention, among the ethylene polymerization processes that are best known to one skilled in the art, a distinction is made between gaseous processes, stirred-bed or fluidized-bed processes, and liquid, suspension, or solution processes.

The catalysts that are used in gaseous polymerization in a fixed bed and even in some cases liquid polymerization are catalysts with a chromium base as a substrate, catalysts such as organoaluminium-titanium, or combinations of a catalyst with a titanium base as a substrate or a co-catalyst with a triethylaluminum base. For the gaseous processes in a fluidized bed, typically two types of catalysts are known: catalysts with a chromium oxide base as a substrate that is modified with titanium or fluorides, and combinations of a catalyst with a titanium base and a co-catalyst with an alkylaluminum base.

The catalysts that are used in liquid polymerization in solution are basically catalysts with a base of a composition of three elements: tributylaluminium, titanium tetrachloride, and vanadium oxychloride in solution in a hydrocarbon. For liquid polymerizations in suspension, one skilled in the art is familiar with basically two types of catalyst: catalysts with a chromium base as a substrate and catalysts of the organometallic type in which the metal is generally titanium.

After polymerization, the separation of the polymer from the other compounds—among which the comonomer is included—and optionally the separation of the polymer from the solvent can be carried out by any suitable physical separation means; it is possible, for example, to cite evaporation or centrifuging. In the case where the polymerization uses a solvent, the latter can also be eliminated during the separation stage which follows the ethenolysis.

According to the process of this invention that is applied to ethylene, after polymerization, the polymers are separated from the fraction that contains ethylene, the comonomer that is more or less impure and that has not reacted, and optionally the solvent. A portion of this last fraction is recycled to the polymerization zone, and another portion of this fraction is sent into the ethenolysis zone, whereby the remainder of this fraction is purged. The portion that is treated in the ethenolysis stage corresponds to about 2 to 90% by weight and preferably about 10 to 50% by weight of the total amount that is obtained after the separation stage of the polymer.

To carry out the ethenolysis stage, the amount of ethylene is adjusted with an addition of fresh ethylene in such a way that the ethylene/(monomer+comonomer) ratio is preferably greater than 10 and even more preferably greater than 20.

In this stage, the ethylene reacts with the internal olefins to form a mixture of olefins that are lighter than the internal olefins from which they are obtained. The formation of heavier products that are obtained from, for example, the reaction of the alpha-olefin on itself, and even the internal olefins, is limited by the holding of excess ethylene.

The metathesis reaction in the presence of ethylene can be catalyzed by various metal oxides that are deposited on substrates. A catalyst that comprises at least one rhenium oxide that is deposited on a substrate that consists of a refractory oxide that contains at least alumina, which is acidic in nature, such as for example alumina itself, silica-aluminas, or zeolites, is preferably used.

As a preferred example, it is possible to cite the catalysts that comprise rhenium heptoxide that is deposited on a gamma alumina, as described in U.S. Pat. No. 4 795 734. The rhenium content (expressed in metallic rhenium) can be between 0.01 and 20%, and preferably between 1 and 15% by weight. The catalysts are subjected to, for example, final thermal activation at a temperature that is between 400 and 1000° C. for a period of 10 minutes to 5 hours under a non-reducing atmosphere.

The catalysts that comprise rhenium heptoxide that is deposited on an alumina can also be modified by the addition of an oxide of another metal. Such modified catalysts comprise, for example, rhenium in the oxide state, from 0.01 to 20% by weight expressed in metallic rhenium, deposited on a substrate that contains at least 75% by weight of alumina and 0.01 to 30% by weight of at least one oxide of a metal that is selected from the group that is formed by niobium and tantalum, as described in Patent FR 2 709 125.

The metathesis reaction is preferably carried out in a liquid phase, without oxygen, oxidized compounds, or moisture and at a temperature of about 0 to 200° C., preferably from about 20 to 150° C., under a pressure that is at least equal to the vapor pressure of the reaction mixture at the reaction temperature. The ethylene that is used for this metathesis reaction is polymerization-grade ethylene, i.e., the flow contains at least 90% by weight of ethylene, preferably at least 95% by weight of ethylene, and even more preferably at least 99% by weight of ethylene.

The catalyst can be used in a fixed bed. As it is to be frequently regenerated, however, it may be necessary to use at least two reactors concurrently, whereby one is operating while the other is regenerating. It is also possible to use, if it is desired to limit the amount of unused catalyst, a mobile catalytic bed system, preferably a mobile catalytic bed system as described in French Patent FR 2 608 595. The catalyst is drawn off at regular time intervals at the bottom of the reactor and transferred to a continuous regeneration system, from which it is sent to the top of the reactor.

Taking into account the excess ethylene and the constraints that are imposed by thermodynamics, the unconverted ethylene is preferably fractionated in a first distillation column and recycled to the ethenolysis reactor and/or to the polymerization zone. For a given comonomer, this column is preferably to make it possible in particular to separate its methylated isomer in the 2-position.

Advantageously, a second distillation column makes it possible to separate at the top the olefins that are lighter than the alpha-olefin that is to be purified, and these products can be purged. It may be advantageous, however, to send these light olefins as a feedstock from a steam-cracking zone upstream from the polymerization zone or toward a zone for separation from said steam-cracking zone in which they can be enriched. The bottom fraction of this second column contains the bulk of the alpha-olefin that is to be recycled, as well as small amounts of heavier products. This fraction is subjected to distillation that makes it possible to recover at the column top the alpha-olefin that is recycled to the polymerization zone.

When the polyethylene (or polypropylene) production facility is equipped with its own unit for producing the comonomer (alpha-olefin), it may be advantageous to integrate the ethenolysis unit with the comonomer production unit so as to take advantage of the fractionating train of the latter.

In a preferred way, the treatment of the ethenolysis effluent is done as follows. The effluent from the ethenolysis reactor is subjected to a series of distillations. The residual ethylene is first separated in a first distillation column and recycled either to the polymerization or partially to the input of the ethenolysis reactor where it participates in the adjustment of the ethylene/(comonomer+isomers of the comonomer) ratio. The bottom effluent is subjected to a distillation operation that makes it possible to eliminate at the top all of the compounds whose boiling points are below that of the comonomer. These products leave the polymerization zone and are sent upstream toward the distillation train, which is, for example, the distillation train of a steam-cracking device.

A variant of this process makes it possible to separate in a first step all of the products whose boiling point is less than that of the comonomer in a first column; in this case, the light products—including ethylene—are necessarily sent toward a distillation train, for example the distillation train of a steam-cracking device that is located upstream from the polymerization unit. According to this variant where the ethenolysis effluent is sent to a steam-cracking zone, recycling of the ethylene is not provided for.

By eliminating the heavy products (new and last distillation), the residue of the last distillation provides an effluent that contains the comonomer and one or more isomers of the comonomer whose comonomer content is greater than 98.9% or of a higher purity than the majority of the available industrial comonomers. This fraction, which is very rich in comonomers, can be recycled directly to the polymerization section.

In addition to the operation of the ethenolysis reactor, the process for recovery of the comonomer therefore requires the use of at least two distillation columns or more generally at least two separation zones.

This invention also relates to an installation for the implementation of the process that comprises at least one polymerization zone into which a monomer and a comonomer are introduced, at least one zone for separating the effluent from the polymerization reaction in which the heavy fraction is isolated that contains at least one polymer of the light fraction that comprises the monomer that has not reacted, the comonomer that has not reacted as well as the isomers of the comonomer, at least one ethenolysis zone in which at least a portion of the light fraction is treated in the presence of ethylene, and at least two separation zones in which the comonomer is isolated from the other components of the effluent.

FIG. 1 depicts a simple embodiment of the process according to the invention.

According to this embodiment, the installation for using the polymerization process comprises at least one polymerization zone P that is equipped with at least one pipe (1) for introducing the monomer, at least one pipe (2) for introducing the comonomer, and at least one pipe (3) for the output of the polymerization effluent. The polymerization effluent then passes into at least one separation zone S1. This separation zone is also equipped with at least one pipe (5) for the evacuation of a heavy fraction that contains at least one polymer and at least one pipe (4) for the evacuation of a light fraction that contains at least the monomer that has not reacted, the comonomer that has not reacted, and isomers of these comonomers; preferably, a pipe (6) makes it possible to recycle a portion of the light fraction to polymerization zone P, and a pipe (13) makes it possible to evacuate a portion of this light fraction outside of the installation.

The installation also comprises at least one ethenolysis zone E that is equipped with at least one pipe (9) for the introduction of ethylene, at least one pipe (7) for the introduction of at least a portion of the flow that circulates in pipe (4) (light fraction), and at least one pipe (8) for the evacuation of the ethenolysis effluent. The ethenolysis effluent is then sent to a separator train S2 that comprises at least two separation zones. Said separator train S2 is equipped with at least one pipe (8) for introducing the ethenolysis effluent, at least one pipe (11) for the evacuation of the olefins whose boiling point is below that of the comonomer, at least one pipe (12) for the evacuation of the compounds whose boiling point is greater than that of the comonomer, and at least one pipe (10) for the recycling of the comonomer that is separated in pipe (2) which supplies polymerization zone P.

The following example treats the special case (but it is also the most widely used industrially) of the recycling of a fraction that contains basically hexenes—1-hexene is then the comonomer that is used—that are obtained from ethylene polymerization in a polymerization process that is known as "gas polymerization." This particular example illustrates the invention without limiting its scope.

EXAMPLE

At the output of the polymerization zone of the unit for the production of "gaseous phase" linear low-density polyethylene (LLDPE), the polymer is separated from the lighter effluents by evaporation/condensation.

In this case—where the polymerization of ethylene (monomer) has been carried out with 1-hexene (comonomer)—the fraction of the light effluents contains, in addition to the ethylene that has not reacted, a hexene mixture whose typical molar composition (without this proportion imposing any limitation on the invention) is provided in Table 1. The isomers of 1-hexene come from several sources: they are either introduced into the device with the fresh 1-hexene—as is the case of 2-methyl 1-pentene—or they are produced during the polymerization reaction—as is the case of 2-hexene and 3-hexene which are obtained from the isomerization of the double bond of the 1-hexene during the polymerization process.

According to FIG. 1, after the heavy fraction is extracted, the light fraction of the effluent from the polymerization zone that contains isomers with 6 carbon atoms is divided into three parts. 35% of this light fraction is directly recycled to the polymerization zone, 15% of this light fraction is purged, and 50% of this light fraction is subjected to the ethenolysis reaction on a metathesis catalyst that consists of rhenium oxide on gamma alumina (8% in bulk in metal rhenium) that is prepared according to the teachings of U.S. Pat. No. 4,795,734. To carry out this ethenolysis reaction, the fresh ethylene is added in such a way that the ethylene/hexenes molar ratio is equal to 24.79.

The input mixture (see Table 1) is introduced into a fluid bed reactor as described in Patent FR 2 608 595, at a temperature of 35° C., and under a pressure of 3.5 MPa, and it is coupled with a regenerator that operates at 550° C. under atmospheric pressure. The catalyst is drawn off at regular intervals at the bottom of the reactor and transferred to the regenerator, from which it is sent to the top of the reactor, whereby the transfers are made through its buffers.

At the output of this reactor, a mixture whose composition is provided in Table 1 is recovered. In this table, the light olefins are olefins with 3, 4, and 5 carbon atoms, the expression "C6" relates to the compounds with 6 carbon atoms, and "other C6s" relates to the compounds with 6 carbon atoms other than hexenes and 2-methyl-1-pentene.

TABLE 1

|  | Ethenolysis Input Reactor (g/h) | Ethenolysis Output Reactor (g/h) |
|---|---|---|
| Ethylene | 833.0 | 831.6 |
| 1-Hexene | 89.2 | 87.0 |
| 2-hexene cis + trans | 6.2 | 0.5 |
| 3-Hexene cis + trans | 2.9 | 0.3 |
| 2-Methyl-1-pentene | 1.5 | 0.1 |
| Other C6s | 0.2 | 0.1 |
| Light olefins | — | 11 |
| Heavy products | — | 2.4 |
| Total of C6s other than 1-hexene | 10.8 | 1 |

It should be noted that a small portion of the 1-hexene disappeared to form heavier products and that a small portion of the ethylene reacted with the internal linear hexenes (2-hexene and 3-hexene) to provide lighter products. The vast majority of the 2-methyl-1-pentene probably partially transformed into heavier products or isomerized products (the double bond is entered into the chain by acid catalysis) before being ethenolyzed.

Ethenolysis therefore made it possible to convert 91% of the isomers of 1-hexene. The majority of these isomers were converted into light olefins and into products that are heavier than these isomers. The light olefins, on the one hand, and the heavy products, on the other, can be easily separated from the fraction of the compound with 6 carbon atoms. The effluent that is sent to the polymerization reactor after separation is therefore greatly purified of the isomers of the comonomer which, at the end of several hours of operation, can become contaminants of the polymerization reaction.

The entire disclosure of all applications, patents and publications, cited above, and of corresponding French application No. 98/02.056 filed Feb. 18, 1998, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A polymerization process comprising
   a) polymerizing a monomer and a comonomer in a polymerization zone, the comonomer being an approximately pure alpha-olefin;
   b) separating, the polymerization effluent from said polymerization zone into two fractions: a heavy fraction that contains at least one polymer, and a light fraction that comprises monomer that has not reacted, comonomer that has not reacted, as well as isomers of said comonomer;
   c) subjecting at least a portion of said light fraction to ethenolysis in the presence of added ethylene;
   d) subjecting the ethenolysis effluent to at least two separations to isolate the comonomer therefrom; and
   e) recycling the comonomer isolated from said ethenolysis effluent to said polymerization zone.

2. A polymerization process according to claim 1, additionally comprising recycling a portion of said light fraction of said polymerization effluent directly to said polymerization zone.

3. A polymerization process according to claim 1, wherein the ethenolysis effluent is sent to a steam-cracking zone.

4. A polymerization process according to claim 1, wherein the ethylene/(comonomer+isomers of the comonomer) molar ratio is greater than 10 during ethenolysis.

5. A polymerization process according to claim 1, wherein the ethenolysis is carried out in the presence of a catalyst that comprises at least one metallic oxide that is placed on a substrate.

6. A polymerization process according to claim 1, wherein the ethenolysis is carried out in the presence of a catalyst that comprises at least one rhenium oxide that is deposited on a refractory oxide of an acidic nature that contains at least alumina.

7. A polymerization process according to claim 1, wherein the ethenolysis is carried out at a temperature of about 0 to 200°, under a pressure that is at least equal to the vapor pressure of the reaction mixture that is the portion of said light fraction subjected to ethenolysis at the reaction temperature for the ethenolysis.

8. A polymerization process according to claim 1, wherein the monomer is selected from the group consisting of ethylene and propylene.

9. A polymerization process according to claim 1, wherein the comonomer is selected from the group consisting of 1-butene, 1-hexene, 1-octene, 4-methyl 1-pentene, and 1-pentene.

10. A polymerization process according to claim 1, wherein the monomers are unsaturated hydrocarbons.

11. A polymerization process according to claim 3, wherein, the ethylene/(comonomer+isomers of the comonomer) molar ratio is greater than 20 during ethenolysis.

12. A polymerization process according to claim 4, wherein the ethenolysis is carried out in the presence of a catalyst that comprises at least one metallic oxide that is placed on a substrate.

13. A polymerization process according to claim 11, wherein the ethenolysis is carried out in the presence of a catalyst that comprises at least one metallic oxide that is placed on a substrate.

14. A polymerization process according to claim 4, wherein the ethenolysis is carried out in the presence of a catalyst that comprises at least one rhenium oxide that is deposited on a refractory oxide of an acidic nature that contains at least alumina.

15. A polymerization process according to claim 11, wherein the ethenolysis is carried out in the presence of a catalyst that comprises at least one rhenium oxide that is deposited on a refractory oxide of an acidic nature that contains at least alumina.

16. A polymerization process according to claim 5,
   wherein the monomer is selected from the group consisting of ethylene and propylene; and
   wherein the comonomer is selected from the group consisting of 1-butene, 1-hexene, 1-octene, 4-methyl 1-pentene, and 1-pentene.

17. A polymerization process according to claim 11,
   wherein the monomer is selected from the group consisting of ethylene and propylene; and
   wherein the comonomer is selected from the group consisting of 1-butene, 1-hexene, 1-octene, 4-methyl 1-pentene, and 1-pentene.

* * * * *